United States Patent [19]

Chow et al.

[11] 3,860,895

[45] Jan. 14, 1975

[54] MAGNETIC SHUNT ASSEMBLY FOR BIAS FIELD APPARATUS

[75] Inventors: Ling George Chow; Jonas K. Vysniauskas, both of Oklahoma City, Okla.

[73] Assignee: Honeywell Information Systems Inc., Waltham, Mass.

[22] Filed: May 28, 1974

[21] Appl. No.: 473,465

[52] U.S. Cl. .................. 335/298, 336/110, 336/133

[51] Int. Cl. .............................................. H01f 3/00

[58] Field of Search...... 340/174 AG; 336/110, 132, 336/133, 134; 335/237, 298, 306

[56] References Cited

UNITED STATES PATENTS

| | | | |
|---|---|---|---|
| 2,555,911 | 6/1951 | Anderson | 336/133 |
| 3,018,422 | 1/1962 | Seaton | 335/298 |
| 3,030,556 | 4/1962 | Watson | 335/298 |
| 3,337,829 | 8/1967 | Schept | 336/110 X |
| 3,412,352 | 11/1968 | Watson | 335/306 X |

*Primary Examiner*—G. Harris
*Attorney, Agent, or Firm*—Gerald R. Woods

[57] ABSTRACT

For adjusting the strength of a bias field established between parallel, permeable plates by adjacent permanent magnets, a separated pair of adjustable magnetic shunt assemblies provide variable reluctance flux paths between the plates. Each assembly has a permeable rectangular bar attached to one of the plates and a permeable U-shaped bar having a bight area which receives the fixed rectangular bar. The position of the U-shaped bar relative to the plates and the rectangular bar can be adjusted to vary the shunt reluctance.

10 Claims, 4 Drawing Figures

MAGNETIC SHUNT ASSEMBLY FOR BIAS FIELD APPARATUS

BACKGROUND OF THE INVENTION

The present invention relates to magnetic domain memory devices and, more particularly, to an improved magnetic shunt assembly for adjusting the strength of a bias field in such devices.

Magnetic domains or bubbles are minute cylindrical areas that can be generated and maintained in thin films of magnetic material deposited on suitable substrates. These cylindrical areas, which are magnetized in the opposite direction from the rest of the thin film material, can be propagated along Permalloy tracks on the film surface by the application of a rotating magnetic field. This field is generated by orthogonal drive coils which encompass the substrates. Suitable thin films, suitable substrates and drive coil configurations are known in the art. Track arrangements for performing shift functions and logic operations are also known in the art.

Magnetic domains can be permanently maintained by an external magnetic bias field having lines of flux ideally extending along normals to the thin film surface. The most commonly used configuration for establishing this bias field is known as a Watson magnet. Two parallel bar magnets are positioned on either side of the drive coil/substrates assembly. The permanent magnets are oriented with the same magnetic poles adjacent the same plate. The lines of flux generated in such a configuration extend along paths including the adjacent permeable plate, the air gap between the plates, the second permeable plate and the opposite magnetic pole of the magnet.

The strength of the bias field is critical. A bias field which is too strong will cause the domains to shrink until they collapse inwardly, resulting in an entire thin film magnetized in one direction. A bias field which is too weak will allow the domains to grow in size until they become unstable and revert to long strip domains characteristic of a randomly magnetized thin film. Strip domains cannot be reliably propagated and are thus unsuitable for use in a memory device.

The magnetic bias field must be generally homogeneous so that all thin films within the field will be subject to similar levels of magnetic flux. While the magnetic strength of newly manufactured permanent magnets can be controlled reasonably well, variations will exist from one magnet to another. To maintain field homogenity, such variations must be compensated for. Moreover, the strength of any magnetic bias field is subject to change due to the effects of aging or temperature variation on the characteristics of the permanent magnets.

Compensation can be provided by using magnetic shunt assemblies between the permeable plates outside of the volume defined by the plates and bar magnets. The reluctance of the shunt assemblies can be adjusted to divert varying amounts of flux, thereby adjusting the intensity of the bias field within the volume bounded by the plates and magnets.

Prior art magnetic shunt assemblies have consisted of a number of steel or Permalloy screws threaded through one of the permeable plates. By individually adjusting the screws to vary the air gap between the tips of the screws and the opposite permeable plate, the overall reluctance of the shunt could be adjusted.

Because of the relatively small volume of each of the screws, the effectiveness of such a shunt is limited. Adjustments can be made only through a relatively small range of flux values.

Efforts to increase the effectiveness of this type of shunt by adding additional screws have not been entirely successful. Since each screw must be individually adjusted, a greater effort must be made to adjust every screw precisely in order to maintain field homogenity. Moreover, the air gaps between the tips of the individual screws and the opposite permeable plate can be increased only by backing the screws out of the permeable plate through which they are threaded. In packaging a magnetic domain memory module having this type of magnetic shunt assembly, space must be allowed for the protruding screw heads.

SUMMARY OF THE INVENTION

The present invention is an effective magnetic shunt assembly which may be easily adjusted within the space bounded by the permeable plates, making it unnecessary to allow packaging space for protruding screw heads.

The improved magnetic shunt assembly includes a magnetically permeable fixed member attached to one of the permeable plates and extending toward the other. A magnetically permeable movable member is in sliding contact with the fixed member and is spaced from the plates. The invention includes means for adjusting the spacing between the movable member and the other of the plates to vary the air gap between the plate and the movable member and thus the shunt reluctance.

DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

DETAILED DESCRIPTION

Figure 1:
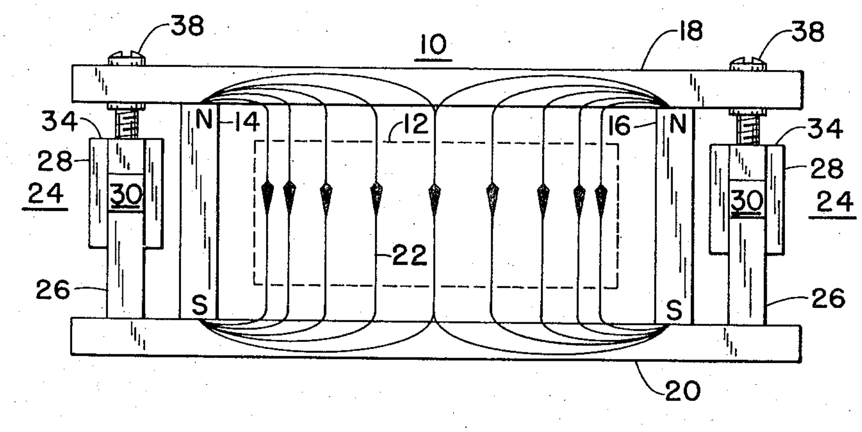
FIG. 1 is a front elevation of a magnetic domain memory module including magnetic shunt assemblies constructed in accordance with the present invention.

Referring now to FIG. 1, a magnetic domain memory device 10 is illustrated in simplified form. The device 10 includes a number of substrates carrying thin films of magnetic material in which cylindrical domains can be generated and maintained. These substrates are encompassed within orthogonal drive coils which establish the rotating magnetic field needed to propagate the cylindrical domains along Permalloy tracks on the film surfaces. The placement of the drive coil/substrates assembly within the magnetic domain memory device 10 is shown by a dotted line rectangle 12. Since the construction of the drive coil/substrates assembly is not a part of the present invention and is not necessary to an understanding of the present invention, no details of this assembly are disclosed. It is only necessary to know that the assembly includes thin films having cylindrical magnetic domains which can be premanently maintained by an external magnetic bias field.

The bias field for the device 10 can be supplied by what is commonly referred to as a Watson magnet. This magnet includes a pair of bar magnets 14 and 16 positioned to the left and to the right, respectively, of the assembly represented by rectangle 12. The bar magnets 14 and 16 are bridged by a magnetically permeable plate 18 and by a similar magnetically permeable plate 20. The bar magnets 14 and 16 are magnetically oriented in the same manner; that is, the north magnetic poles for both magnets are adjacent either plate 18 or 20. For purposes of illustration, it is assumed that the north magnetic poles for both magnets 14 and 16 are adjacent the permeable plate 18.

The lines of flux established by the magnets 14, 16 and plates 18, 20 are directed along paths which extend from one of the magnetic poles of the magnet through the permeable plate adjacent that pole, ideally normally through the volume bounded by the plates 18 and 20 into the other plate, through that plate to the opposite pole of the magnet. The lines, such as line 22, are intended to illustrate some of the lines of flux following the described paths.

Although not illustrated in FIG. 1, lines of flux are also established in the air space to the left of magnet 14 and in the air space to the right of magnet 16. These lines also follow paths from one magnetic pole to the other through the air space. Identical magnetic shunt assemblies 24 are shown in these air spaces. Each magnetic shunt assembly 24 provides a variable reluctance shunt flux path for magnetic flux generated by the adjacent magnet. By varying the reluctance of the shunt assemblies, greater or lesser amounts of magnetic flux can be diverted from the volume occupied by the drive coil/substrates assembly illustrated by rectangle 12. By establishing a low reluctance shunt, the bias field in the volume can be greatly weakened. Conversely, a high reluctance shunt results in a strong bias field.

Figure 2:
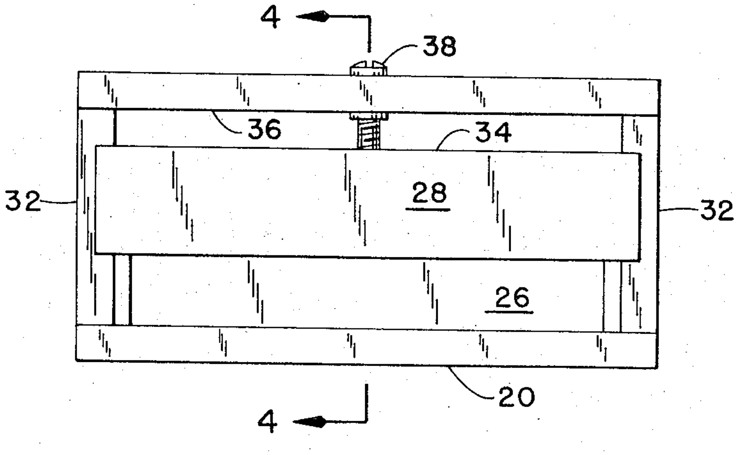
FIG. 2 is a side elevation of the magnetic memory module shown in FIG. 1.

Referring now to FIGS. 1 and 2 together, each magnetic shunt assembly 24 includes a generally rectangular fixed member 26 secured to the interior surface of the plate 20. The major planar surfaces of fixed member 26 extend along right angles or normals from the surface of the plate 20 toward the interior surface of the plate 18. The fixed member 26 is fastened to the plate 20, preferably by magnetically permeable screws. Each shunt assembly 24 also includes a movable member 28 which has a generally U-shaped cross-section as may best be seen in FIG. 1. The bight 30 of each movable member 28 is aligned with and receives the fixed member 26. At least one of the interior walls of the bight 30 remains in sliding contact with a major planar surface on fixed member 26. Movements of movable member 28 are constrained not only by fixed member 26 but also by non-magnetic guide members 32 which, in a preferred embodiment, consist of rectangular bars connecting the plates 18 and 20 along normals to the plates. Guide members 32, which are aligned with fixed member 26, are not shown in FIG. 1 so that the ends of fixed member 26 and movable member 28 can be viewed.

Movable member 28 is spaced from both plate 18 and plate 20. The shunt reluctance is controlled by adjusting the air gap between the upper surface 34 of movable member 28 and the lower surface 36 of the plate 18. The mechanism used in making this adjustment includes a nonmagnetic bolt 38 described in some detail below.

Figure 3:
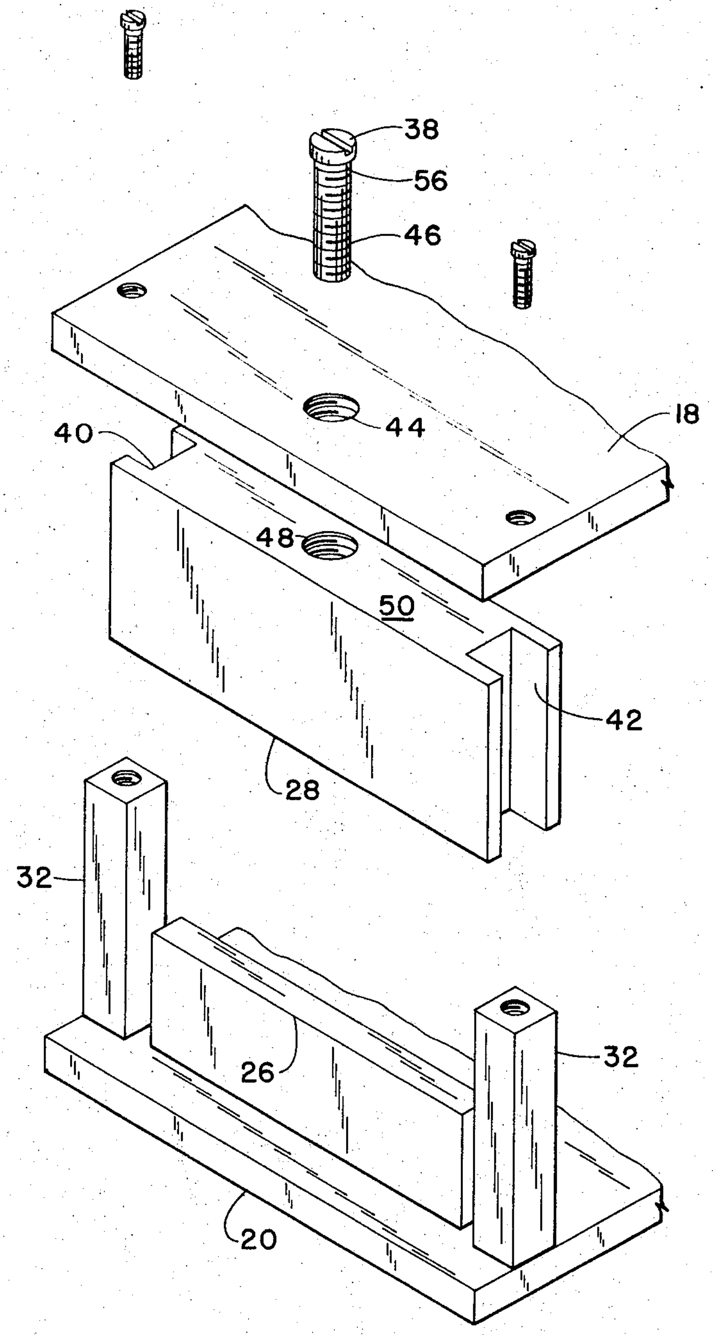
FIG. 3 is an exploded perspective of the details of the improved magnetic shunt assembly.

Referring now to FIG. 3, movable member 28 includes recesses 40 and 42 at the left and right ends, respectively. The interior dimensions of these recesses generally match the exterior dimensions of the guide members 32. The position of movable member 28 can be adjusted by means of the nonmagnetic bolt 38 which is inserted through an opening 44 near one edge of the permeable plate 18. The shank 46 of nonmagnetic bolt 38 is received within an internally threaded opening 48 in the base 50 of the U-shaped movable member 28. The threads on shank 46 mate with the threads in opening 48.

Figure 4:
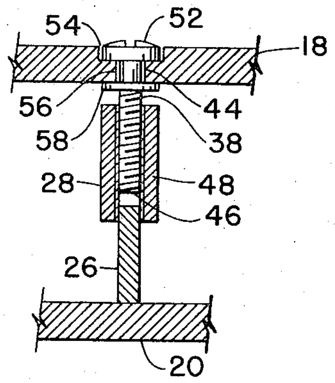
FIG. 4 is a cross-section of an adjusting mechanism, viewed along lines 4—4 in FIG. 2.

Referring to FIG. 4, the nonmagnetic bolt 38 includes an enlarged haed 52 seated in a recess 54 in the surface of permeable plate 18. A neck 56 extends through the opening 44 in plate 18. The neck 56 is smaller than the hole 44. A retaining ring 58 is mounted on neck 56 at the interior surface of plate 18. The enlarged head 52 and the retaining ring 58 prevent axial movement of the nonmagnetic bolt 38 relative to the plate 18 while the oversized opening 44 permits rotation of bolt 38.

Since the movable member 28 is prevented from rotating by guide bars 32 and fixed member 26, the rotation of bolt 38 causes the movable member 28 to be lifted or lowered relative to the other members.

Because the volumes of the fixed member 26 and movable member 28 are much greater than the volumes of the adjustable screws used in prior art magnetic shunt assemblies, the reluctance of the shunt assembly described herein can be adjusted through an extremely wide range of values. Because the air gap between the upper surface 34 of movable member 28 and the parallel interior surface 36 of plate 18 is controlled by a single bolt 38, the reluctance of that shunt path can be readily and precisely controlled within the range of values. Moreover, since the nonmagnetic bolt 38 is axially immovable with respect to the permeable plates 18 and 20, no packaging space need be allowed for protruding screw heads as was required in the prior assemblies.

While there has been described what is considered to be a preferred embodiment of the present invention, it is obvious that variations and modifications in that embodiment will occur to those skilled in the art once they become familiar with the concepts of the invention. For example, while the improved magnetic shunt assembly described herein is shown for use in a Watson magnet configuration, other magnet configurations could be used.

Therefore, it is intended that the appended claims shall be construed as covering all such variations and modifications as fall within the true spirit and scope of the invention.

We claim:

1. For use with a bias field apparatus having parallel magnetically permeable plates and adjacent magnets for establishing a magnetic field in the volume bounded by the plates, an improved magnetic shunt assembly for adjusting the strngength of the magnetic field comprising:

a. a magnetically permeable fixed member secured to one of the plates and extending toward the other of the plates;

b. a magnetically permeable movable member spaced from the plates and in sliding contact with the fixed member; and
c. means for adjusting the air gap between a surface of the movable member and the other of the plates to vary the reluctance of the shunt assembly.

2. An improved magnetic shunt assembly as recited in claim 1 further including guide members extending from the one plate to the other plate for constraining movement of the movable member to a predetermined path.

3. An improved magnetic shunt assembly as recited in claim 2 wherein the guide members extend along a normal to the plates.

4. An improved magnetic shunt assembly as recited in claim 3 wherein the fixed member comprises a generally rectangular bar extending along a normal to the plates, and the movable member comprises a bar having at least one surface which remains in contact with the fixed member as the movable member is guided along the normal by the guide members.

5. An improved magnetic shunt assembly as recited in claim 4 wherein the movable member has a generally U-shaped cross-section having a bight within which the fixed member is received.

6. An improved magnetic shunt assembly as recited in claim 5 wherein the movable member further includes recesses at opposite ends thereof for receiving the guide members.

7. For use in a magnetic domain memory device having parallel, magnetically permeable plates and a pair of interposed bar magnets located near opposite edges of the magnetically permeable plates for establishing a bias field in the volume bounded by the plates and magnets, a pair of improved magnetic shunt assemblies for adjusting the strength of the bias field in the volume, each of said assemblies being located adjacent one of the bar magnets and comprising:
a. a magnetically permeable fixed member secured to one of the plates and having at least one planar surface extending along a normal to the magnetically permeaable plates;
b. guide bars connecting the magnetically permeable plates along a normal to the plates;
c. a magnetically permeable movable member linearally movable along the guide bars and having at least one planar surface in sliding contact with the planar surface of the fixed member; and
d. means for adjusting the air gap between a surface of the fixed member and the adjacent plate to vary the reluctance of the assembly.

8. An apparatus as defined in claim 7 wherein the fixed member in each shunt assembly is a generally rectangular bar having its major planar surfaces extending along normals to the plates.

9. An apparatus as defined in claim 8 wherein the movable member has a generally U-shaped cross-section with the bight of the cross-section receiving the fixed member.

10. An apparatus as defined in claim 9 wherein the movable member further includes an internally threaded opening in the base of the U-shaped cross-section, the magnetically permeable plate adjacent the base includes an opening aligned with the threaded opening in the base and the adjusting means further comprises a nonmagnetic bolt having a head rotatable within but axially immovable with respect to the opening through the plate and a threaded shank extending into and mated with the internally threaded opening in the base of the movable member.

* * * * *